(12) United States Patent
Lindemann et al.

(10) Patent No.: US 10,030,752 B2
(45) Date of Patent: Jul. 24, 2018

(54) TORQUE CONVERTER INCLUDING AN ELASTIC ELEMENT PRELOADING AN AXIALLY MOVABLE TURBINE

(71) Applicants: Schaeffler Technologies GmbH & Co. KG, Herzogenaurach (DE); Schaeffler Group USA, Inc., Fort Mill, SC (US)

(72) Inventors: Patrick Lindemann, Wooster, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 834 days.

(21) Appl. No.: 14/337,025

(22) Filed: Jul. 21, 2014

(65) Prior Publication Data

US 2015/0027110 A1 Jan. 29, 2015

Related U.S. Application Data

(60) Provisional application No. 61/857,498, filed on Jul. 23, 2013.

(51) Int. Cl.
*F16H 45/02* (2006.01)
*F16H 41/28* (2006.01)
*F16H 41/24* (2006.01)

(52) U.S. Cl.
CPC ............ *F16H 45/02* (2013.01); *F16H 41/24* (2013.01); *F16H 41/28* (2013.01); *F16H 2041/243* (2013.01); *F16H 2045/0231* (2013.01); *F16H 2045/0247* (2013.01); *F16H 2045/0263* (2013.01); *F16H 2045/0278* (2013.01); *Y10T 29/4933* (2015.01)

(58) Field of Classification Search
CPC .... F16H 41/24; F16H 41/28; F16H 2041/243; F16H 2045/0278; F16H 45/02; F16H 2045/0221–2045/0268; Y10T 29/4933
USPC ................................................... 60/349, 350
See application file for complete search history.

(56) References Cited

U.S. PATENT DOCUMENTS 2,920,728 A   1/1960 Forster
4,437,551 A   3/1984 Gimmler et al.
(Continued)

FOREIGN PATENT DOCUMENTS

DE            2245901 A1   4/1974

OTHER PUBLICATIONS

PCT Written Opinion for corresponding International Application PCT/US2014/047485.
PCT/US2014/047485.

*Primary Examiner* — Terry C Chau
(74) *Attorney, Agent, or Firm* — Davidson, Davidson & Kappel, LLC

(57) ABSTRACT

A torque converter is provided. The torque converter includes an impeller; a turbine axially movable toward and away from the impeller; and a damper coupled to the turbine, the damper including an elastic element forcing the turbine against the impeller in an equal pressure condition. A method of forming a torque converter is also provided. The method includes forming a damper to include an elastic element; providing the damper inside a front cover so the damper contacts the front cover; and providing axially movable turbine between the damper and an impeller such that the elastic element forces the turbine to engage an impeller in an equal pressure condition.

19 Claims, 5 Drawing Sheets

(56) References Cited

U.S. PATENT DOCUMENTS

| | | | | |
|---|---|---|---|---|
| 5,575,363 | A * | 11/1996 | Dehrmann | F16H 45/02 192/113.3 |
| 5,771,998 | A | 6/1998 | Olsen et al. | |
| 6,321,891 | B1 * | 11/2001 | Olsen | F16H 45/02 192/200 |
| 9,394,981 | B2 * | 7/2016 | Lindemann | F16H 45/02 |
| 2006/0086584 | A1 | 4/2006 | Maucher et al. | |
| 2007/0074943 | A1 * | 4/2007 | Hemphill | F16H 45/02 192/3.25 |
| 2013/0230385 | A1 * | 9/2013 | Lindemann | F16D 33/18 415/122.1 |
| 2014/0097055 | A1 * | 4/2014 | Lindemann | F16H 41/24 192/3.21 |
| 2016/0153534 | A1 * | 6/2016 | Lindemann | F16H 45/02 192/3.28 |

\* cited by examiner

TORQUE CONVERTER INCLUDING AN ELASTIC ELEMENT PRELOADING AN AXIALLY MOVABLE TURBINE

This claims the benefit to U.S. Provisional Patent Application No. 61/857,498, filed on Jul. 23, 2013, which is hereby incorporated by reference herein.

The present disclosure relates to drive assemblies of torque converters, and more particularly to preloading turbine shells of torque converters.

BACKGROUND

U.S. Pat. No. 5,771,998 shows a torque converter assembled to a solid stop and a spring that is compressed by a piston during engagement.

SUMMARY OF THE INVENTION

A torque converter is provided. The torque converter includes an impeller; a turbine axially movable toward and away from the impeller; and a damper coupled to the turbine, the damper including an elastic element forcing the turbine against the impeller in an equal pressure condition.

Embodiments of the torque converter may also include one or more of the following advantageous features:

The torque converter may further include a drive tab connected to the turbine, the drive tab rotationally coupling the turbine to the damper. The drive tab may engage springs of the damper. The torque converter may further include a front cover for connecting to an engine, the damper including a thrust surface for slidingly engaging the front cover. A first side of the turbine faces the impeller and a second side of the turbine faces the damper and the elastic element may be designed such that the turbine is forced away from the impeller when a pressure on the first side of the turbine exceeds a pressure on the second side of the damper by a predetermined amount. The elastic element may be compressed when the pressure on the first side of the turbine exceeds the pressure on the second side of the damper by the predetermined amount. The turbine may include a turbine shell having a friction surface and the friction surface may contact the impeller in the equal pressure condition. The turbine shell may include a rounded portion and an outer radial extension protruding from the rounded portion and a friction material may be attached to the outer radial extension to form the friction surface. A shell of the impeller may be formed from a rear cover of the torque converter and the friction surface of the turbine shell may contact the rear cover in the equal pressure condition. The torque converter may further include a rear cover and the turbine shell may force the impeller into the rear cover in the equal pressure condition. The damper may include a spring retainer and the elastic element may be formed in the spring retainer. The damper may include a cover plate and the elastic element may be formed in the cover plate. The elastic element may be formed by at least one flexible finger.

A method of forming a torque converter is also provided. The method includes forming a damper to include an elastic element; providing the damper inside a front cover; and providing axially movable turbine between the damper and an impeller such that the elastic element forces the turbine to engage an impeller in an equal pressure condition.

Embodiments of the method may also include one or more of the following advantageous features:

The providing a turbine between the damper and an impeller may include connecting the front cover to a rear cover by providing an axial extension of the rear cover radially inside of an axial extension of the front cover. The connecting the front cover to the rear cover may further include welding the axial extension of the rear cover to the axial extension of the front cover. The forming the damper may include forming a thrust surface on the damper and the providing the damper may include contacting the front cover with the thrust surface. The method may further include connecting a drive tab to the turbine and the providing the turbine between the damper and the impeller may providing the drive tab so the drive tab circumferentially engages the damper. The method may further include providing a friction surface on the turbine and the friction surface may engage the impeller in the equal pressure condition. A shell of the impeller may be formed by a rear cover of the torque converter and the elastic element may force the turbine to engage the impeller shell in the equal pressure condition.

BRIEF DESCRIPTION OF THE DRAWINGS

The present invention is described below by reference to the following drawings, in which.

DETAILED DESCRIPTION

Figure 1:
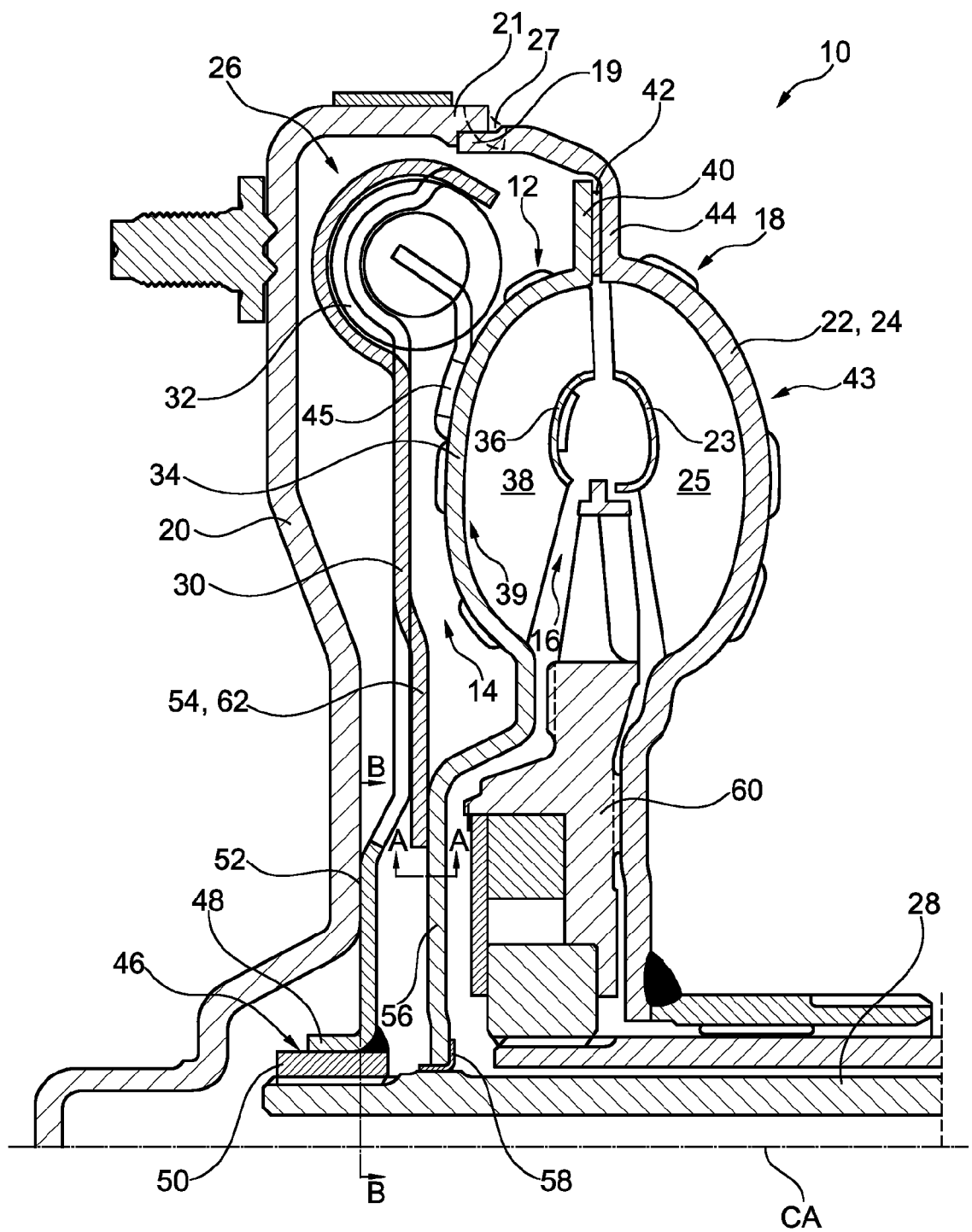
FIG. 1 shows a torque converter according to an embodiment of the present invention.

The disclosure provides a torque converter having an impeller and front cover that are fit together at a solid stop (no liftoff control). That is, a rim of the impeller is installed into a mating front cover rim until an impeller rim radial wall contacts a front cover radial wall. The two components are then fixed together by welding. A displaceable elastic element takes up tolerances so that the turbine clutch is engaged with the impeller in an equal pressure condition. In other words, the torque converter is assembled without any torque converter clutch liftoff. Increasing release pressure pushes the turbine clutch away from the impeller and further compresses the spring element.

Torque converters that use the turbine shell as a piston plate result in a clutch that experiences turbine thrust. In the coast condition (where the turbine rotates at a greater speed than the impeller), the turbine thrust is directed towards the engine, disengaging the clutch. Such torque converters may require the use of height adjustment shims between the impeller shell and front cover shell to control liftoff of the torque converter clutch if the torque converter closure weld stacks solid between the front cover and the impeller. That is, because the thrust force urges the clutch to disengage in a coast condition, it may be necessary to shim the converter assembly to minimize a flow gap at the friction surface, allowing a sufficient pressure force to close the clutch. Without shims, component tolerances for a normally open clutch could result in a large gap at the friction interface if the torque converter is assembled to a solid stop. The large gap may prevent the clutch from engaging if the pressure force cannot overcome the turbine thrust force, or may result in a harsh engagement if the large gap is suddenly closed. Embodiments of the present invention employ a closure weld that stacks solid without the use of shims, which add cost and complexity to a torque converter.

Embodiments disclosed herein provide a smooth clutch engagement in the coast condition by keeping the clutch lift-off to a minimum. In zero-lift-off embodiments, the clutch lift-off between the turbine friction material and the impeller is completely removed. The zero-lift-off is achieved by stacking solid at the closure weld between the front cover and the impeller. The solid stack also closes gaps that would otherwise allow weld contamination to enter the torque converter.

To achieve the solid stack closure weld without adding shims, an elastic element pushes against the turbine and takes up the stackup tolerance inside the torque converter. The elastic element has small relative motion (damper windup) against the turbine and uses rounded or folded up edges to prevent damage in this steel-to-steel contact. A cover thrust surface between the damper and the front cover has a greater relative motion (full engine/transmission difference) than the elastic element and may use a continuous ring on the steel-to-steel contact.

The elastic element provides enough deflection to cover stackup tolerances and TC ballooning. That is, the elastic element is designed to keep the turbine friction material engaged with the impeller when combined component tolerances result in a maximum distance between the turbine and the cover, and preloaded such that the clutch remains in contact during axial growth of the torque converter due to hydrodynamic pressure under high rotational speeds. During clutch apply, where the turbine is forced against the impeller by a clutch differential pressure, the preload fingers act in the same direction as the clutch differential pressure. In clutch release, where the turbine is forced away from the impeller by a pressure inside the torus separates the impeller and the turbine, pushing the turbine against the elastic element. The pressure required to release the clutch is increased to overcome the force of the elastic element, which improves coast engagement by allowing the apply force build-up even at low apply flow and low apply pressure.

FIG. 1 shows a torque converter 10 according to an embodiment of the present invention. Torque converter 10 includes an axially movable turbine 12 that is slidable by pressures on a first side 14 and second side 16 of turbine 12 to move turbine 12 in and out of contact with an impeller 18. Torque converter 10 includes a front cover 20 for connecting with a crankshaft of a motor vehicle engine and a rear cover 22 forming a shell 24 of impeller 18. Front cover 20 and rear cover 22 are both substantially cup shaped and are joined by providing an axial extension 19 of rear cover 22 radially inside of an axial extension 21 of front cover 20. Front cover 20 includes a radial wall for axial positioning of the rear cover, thereby improving an overall length tolerance of torque converter 10 and limiting clearance to reduce contamination from welding. Axial extension 21 may then be welded to axial extension 19 to form a weld 27.

Impeller shell 24 and an inner ring 23 support a plurality of impeller blades 25 therebetween. A damper 26 is positioned between front cover 20 and turbine 12 for transferring torque from turbine 12 to a shaft 28, which may be coupled to a drive component, for example a variable-speed transmission. Damper 26 includes a spring retainer 30 retaining a plurality of arc springs 32 at a radial outer end of damper 26.

Turbine 12 is formed by a turbine shell 34 and an inner ring 36 supporting a plurality of turbine blades 38 therebetween. Turbine shell 34 includes a rounded portion 39 supporting turbine blades 38 and an outer radial extension 40 radially protruding from rounded portion 39. Outer radial extension 40 has a friction surface formed by a frictional material layer 42 attached to a side of outer radial extension 40 facing toward rear cover 22. Turbine shell 34 engages impeller 18 at radially extending portion 42 of impeller shell 24, which extends radially from a rounded portion 43 of impeller 18 supporting impeller blades 25, via friction material 42 to transfer torque input into front cover 20 by the engine crankshaft to shaft 28. A drive tab 45 is fixed to an outer surface of rounded portion 39 of turbine shell 34 and circumferentially drivingly engages damper 26 via springs 32 by extending into spaces circumferentially between arc springs 32. As turbine 12 is driven by impeller 18, either through contact via friction material 42 and impeller shell 24 or through fluid flow between blades 25, 38, turbine 12 transfers torque to damper 26 via drive tab 45. Damper 26, at a radially inner end of spring retainer 30, is non-rotatably connected to shaft 28 by a connection 46, which in this embodiment is formed by welding an axial flange 48 of spring retainer 30 to a splined ring 50 having an inner spline surface that is connected to an outer spline surface of shaft 28.

As damper 26 is rotated by turbine 12, a thrust surface 52 of spring retainer 30 contacts an inner surface of front cover 20. To limit or prevent wear of thrust surface 54, this portion of spring retainer 30 is modified to have a low coefficient of friction, which provides for smooth interactions between thrust surface 52 and the inner surface of front cover 20. For example, thrust surface 52 may be formed by a Telfon coating, a layer of low friction material, a plastic washer or a bearing.

Damper 26 also advantageously includes an elastic element 54 for forcing turbine 12 into engagement with impeller 18. In an equal pressure condition, where the pressures on the first and second sides 14, 16 of turbine 12 are equal, elastic element 54 preloads turbine 12 against impeller 18 by causing friction material 42 to contact outer radial portion 44 of impeller shell 24. Elastic element 54 contacts an inner radial extension 56 of turbine shell 34, which extends radially inward from rounded portion 39 and is axially slidable along a sealing ring 58 surrounding shaft 28. Sealing ring 58 includes an axial flange contacting shaft 28 and a radial flange. Turbine 12 and stator 60 include respective radial walls acting as an axial stop limiting the movement of the turbine towards the stator. Similarly, impeller 18 and stator 60 include respective radial walls limiting displacement of the stator. The stator walls may include oil flow grooves indicated by dashed lines in the figures to reduce friction.

Figure 2A:
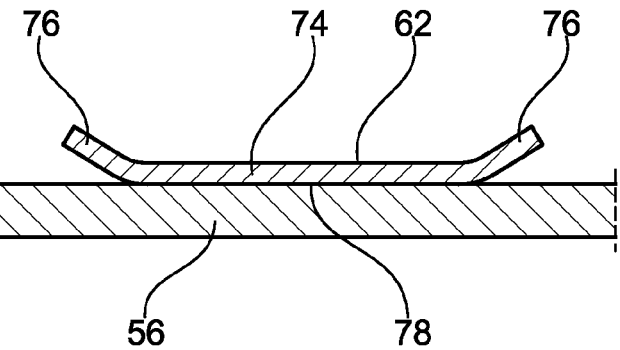
FIG. 2a and FIG. 2b show views of a preload finger of a damper of the torque converter shown in FIG. 1.
Figure 2B:
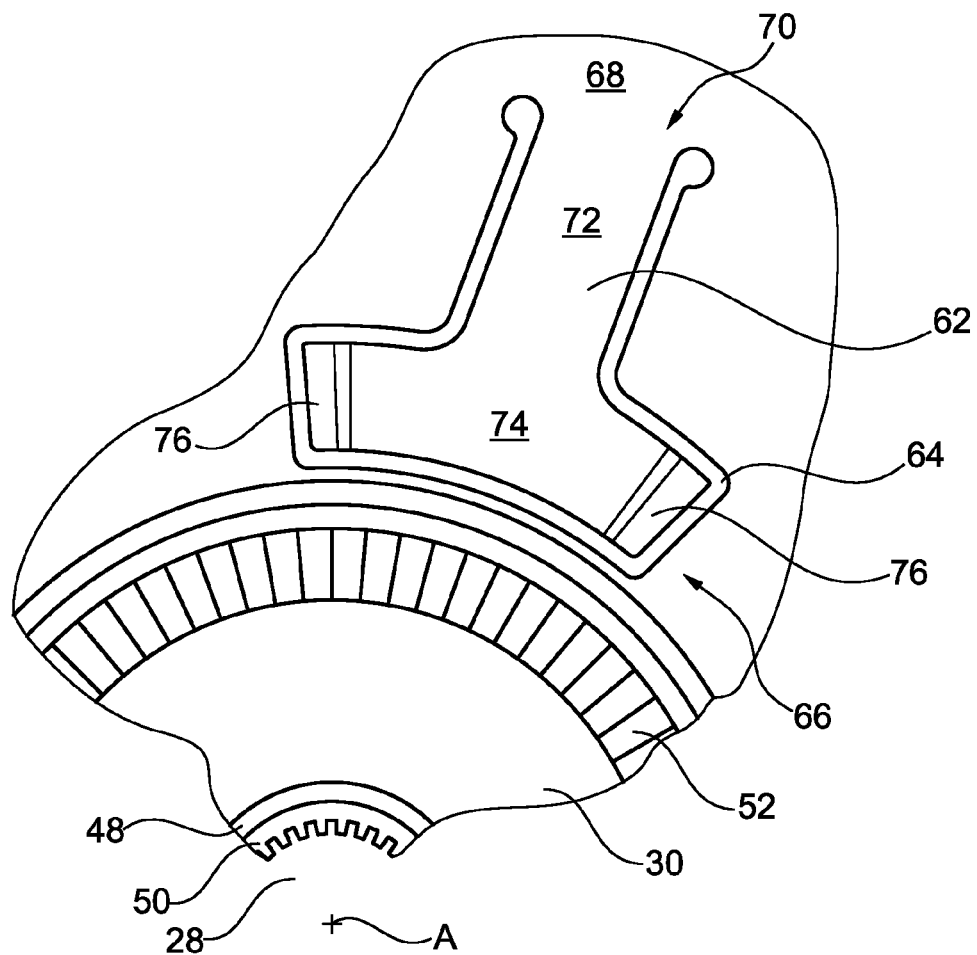

In one preferred embodiment, elastic element 54 is formed by at least two preload fingers 62 as shown in FIGS. 2a and 2b. FIG. 2a shows a view of preload finger 62 and inner radial extension 56 of turbine shell 34 along A-A in FIG. 1 and FIG. 2b shows a view of preload finger 62 and thrust surface 52 along B-B in FIG. 1. In this embodiment, spring retainer 30 is a sheet of metal processed to remove material therefrom to form slots 64 that define preload finger 62 in spring retainer 30 and provide preload finger 62 with a flexible geometry. Preload finger 62 includes a free end 66 connected to a body 68 of spring retainer 30 by a base end 70. A radially extending portion 72 of preload finger 62 extends from base end 70 into a circumferentially extending portion 74 such that preload finger 62 is substantially T-shaped. Circumferentially extending portion 74 includes two circumferentially extending ends 76 protruding from radially extending portion 72 that are bent so as to extend axially away from a contact surface 78 of preload finger 62 that contacts inner radial extension 56 of turbine shell 34. Contact surface 78 may be modified to have a low coefficient of friction, for example formed by a Teflon coating, a layer of low friction material, a plastic washer or a bearing, which provides for smooth interactions between contact surface 78 and front facing surface of inner radial extension 56. Thrust surface 52 is formed as a ring extending circumferentially around center axis CA of torque converter 10.

Figure 3:
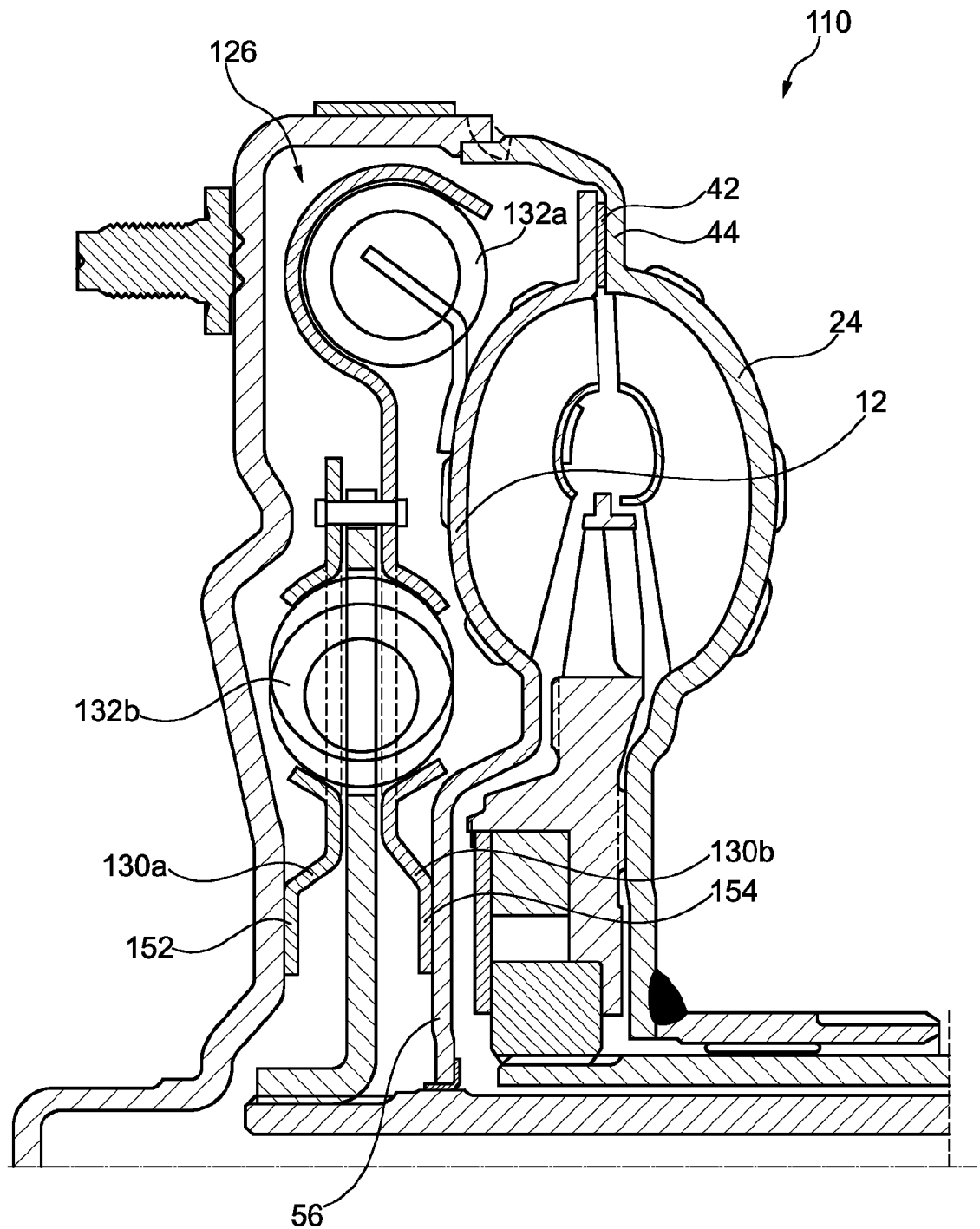
FIG. 3 shows a torque converter according to a second embodiment of the present invention.

FIG. 3 shows a torque converter 110 according to another embodiment of the present invention. Torque converter 110 is configured in substantially the same manner as torque converter 10, but with damper 26 being replaced with a series damper 126 having a radially outer set of arc springs 132a and a radially inner set of arc springs 132b. Damper 126 includes a front facing cover plate 130a and rear facing cover plate 130b supporting springs 132b. Front facing cover plate 130a includes a thrust surface 152 formed in the same manner as thrust surface 52 and rear facing cover plate 130b includes a thrust surface 154 contacting inner radial extension 56 of turbine shell 34. Portions 152 and/or 154 may comprise an elastic element. In an example embodiment the elastic element may be formed in the same manner as elastic element 54. As with torque converter 10, elastic element 154 preloads turbine 12 against impeller 18 in the equal pressure condition by causing friction material 42 to contact outer radial portion 44 of impeller shell 24.

Figure 4:
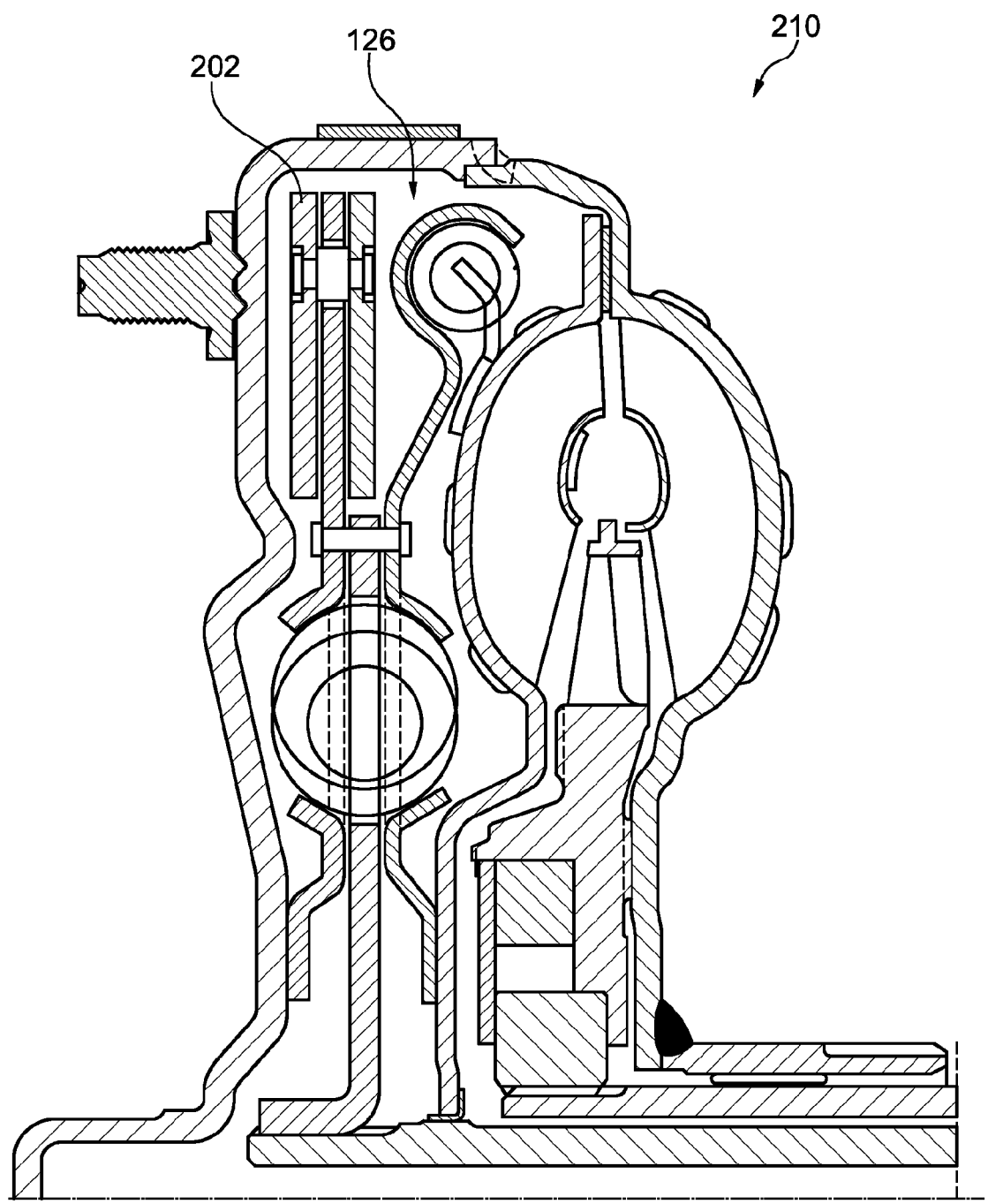
FIG. 4 shows a torque converter according to a third embodiment of the present invention.

FIG. 4 shows a torque converter 210 according to another embodiment of the present invention. Torque converter 210 is configured in substantially the same manner as torque converter 110, but damper 226 additionally includes a centrifugal pendulum absorber 202 to provide additional torsional vibration absorption.

Figure 5:
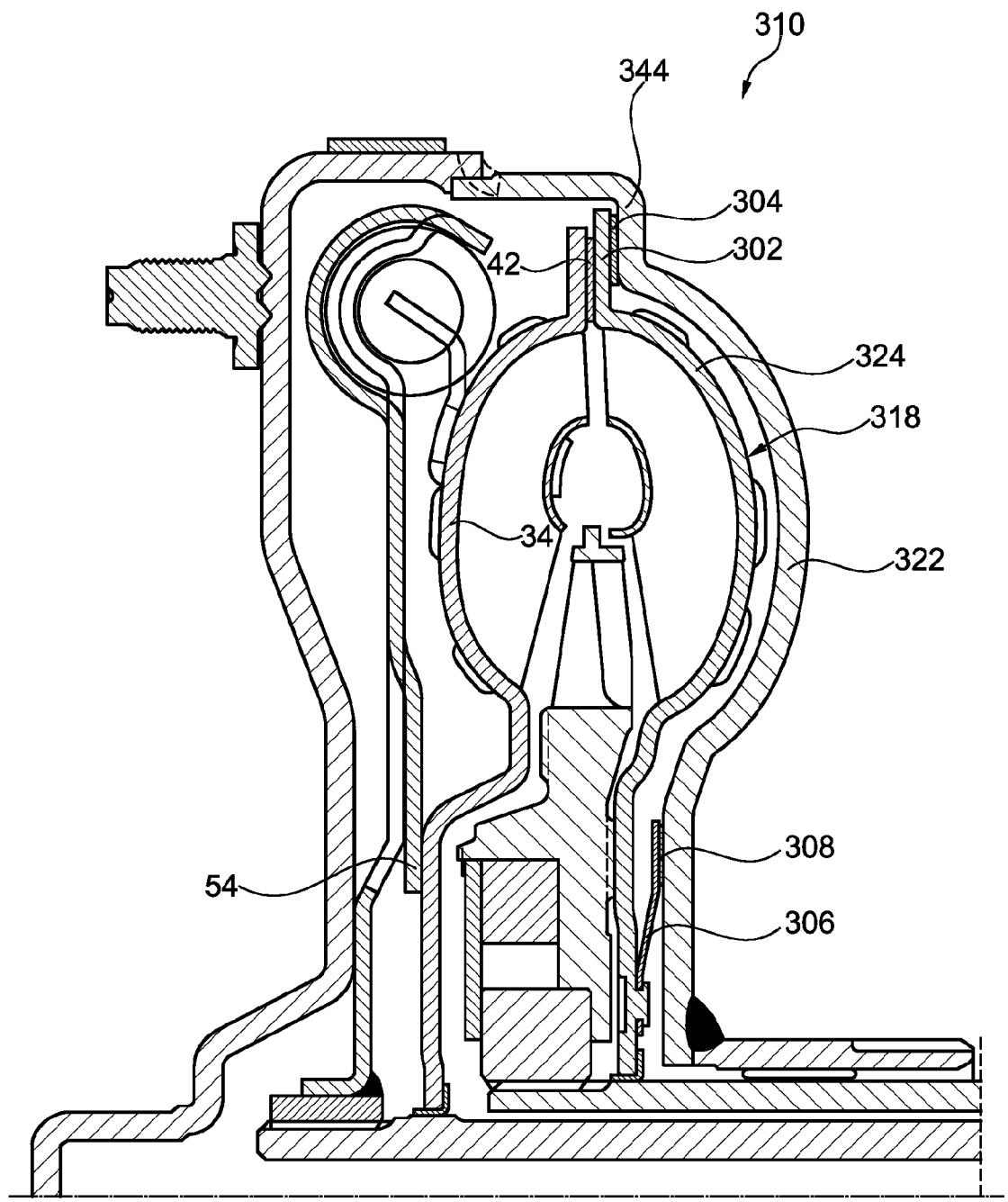
FIG. 5 shows a torque converter according to a fourth embodiment of the present invention.

FIG. 5 shows a torque converter 310 according to another embodiment of the present invention. Torque converter 310 is configured in substantially the same manner as torque converter 10, but with impeller 18 being replaced with an impeller 318 that may be decoupled from the crankshaft of the engine. In contrast with impeller 18, impeller 318 includes an impeller shell 324 that is distinct from a rear cover 322 of torque converter 310. Impeller shell 324 includes an outer radial extension 302 for contact with friction material 42 of turbine shell 34. Outer radial extension 302 includes a friction surface formed by a friction material 304 for engaging with a radial extending portion 344 of rear cover 322 to couple turbine 12 to impeller 318 and rear cover 322. In the equal pressure condition, elastic element 54 forces turbine 12 against impeller 18 so a leaf spring 306, which includes a thrust surface 308 contacting cover 322, between impeller shell 324 and cover 322 is compressed and impeller 318 engages rear cover 322 via friction material 304.

In additional alternative embodiments of the present invention the elastic element may be formed by one or more diaphragm springs, coil springs or rubber to preload the turbine against the impeller.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
    an impeller;
    a turbine axially movable toward and away from the impeller;
    a damper coupled to the turbine, the damper including an elastic element forcing the turbine against the impeller in an equal pressure condition in which a fluid pressure on a first side of the turbine equals a fluid pressure on a second side of the turbine; and
    a front cover for connecting to an engine, the damper including a thrust surface for slidingly engaging the front cover.

2. The torque converter as recited in claim 1 further comprising a drive tab connected to the turbine, the drive tab rotationally coupling the turbine to the damper.

3. The torque converter as recited in claim 2 wherein the drive tab engages springs of the damper.

4. The torque converter as recited in claim 1 wherein the first side of the turbine faces the impeller and the second side of the turbine faces the damper, the elastic element being designed such that the turbine is forced away from the impeller when the fluid pressure on the first side of the turbine exceeds the fluid pressure on the second side of the turbine by a predetermined amount.

5. The torque converter as recited in claim 4 wherein the elastic element is compressed when the pressure on the first side of the turbine exceeds the pressure on the second side of the turbine by the predetermined amount.

6. The torque converter as recited in claim 1 wherein the damper includes a spring retainer, the elastic element being formed in the spring retainer.

7. The torque converter as recited in claim 1 wherein the damper includes a cover plate, the elastic element being formed in the cover plate.

8. The torque converter as recited in claim 1 wherein the elastic element is formed by at least one flexible finger.

9. A torque converter comprising:
    an impeller;
    a turbine axially movable toward and away from the impeller; and
    a damper coupled to the turbine, the damper including an elastic element forcing the turbine against the impeller in an equal pressure condition in which a fluid pressure on a first side of the turbine equals a fluid pressure on a second side of the turbine,
    wherein the turbine includes a turbine shell having a friction surface, the friction surface contacting the impeller in the equal pressure condition.

10. The torque converter as recited in claim 9 wherein the turbine shell includes a rounded portion and an outer radial extension protruding from the rounded portion, a friction material being attached to the outer radial extension to form the friction surface.

11. The torque converter as recited in claim 9 wherein a shell of the impeller is formed from a rear cover of the torque converter, the friction surface of the turbine shell contacting the rear cover in the equal pressure condition.

12. The torque converter as recited in claim 9 further comprising a rear cover, the turbine shell forcing the impeller into the rear cover in the equal pressure condition.

13. A method for forming a torque converter comprising:
    forming a damper to include an elastic element;
    providing the damper inside a front cover; and
    providing axially movable turbine between the damper and an impeller such that the elastic element forces the turbine to engage an impeller in an equal pressure condition in which a fluid pressure on a first side of the turbine equals a fluid pressure on a second side of the turbine.

14. The method as recited in claim 13 wherein the providing the turbine between the damper and the impeller includes connecting the front cover to a rear cover by providing an axial extension of the rear cover radially inside of an axial extension of the front cover.

15. The method as recited in claim 14 wherein the connecting the front cover to the rear cover further includes welding the axial extension of the rear cover to the axial extension of the front cover.

16. The method as recited in claim 13 wherein the forming the damper includes forming a thrust surface on the damper, the providing the damper including contacting the front cover with the thrust surface.

17. The method as recited in claim 13 further comprising connecting a drive tab to the turbine, the providing the turbine between the damper and the impeller including providing the drive tab so the drive tab circumferentially engages the damper.

18. The method as recited in claim 13 further comprising providing a friction surface on the turbine, the friction surface engaging the impeller in the equal pressure condition.

19. The method as recited in claim 13 wherein a shell of the impeller is formed by a rear cover of the torque converter, the elastic element forcing the turbine to engage the impeller shell in the equal pressure condition.

\* \* \* \* \*